(No Model.)
J. H. DICKINSON.
AERIAL TRAMWAY.
No. 549,060. Patented Oct. 29, 1895.
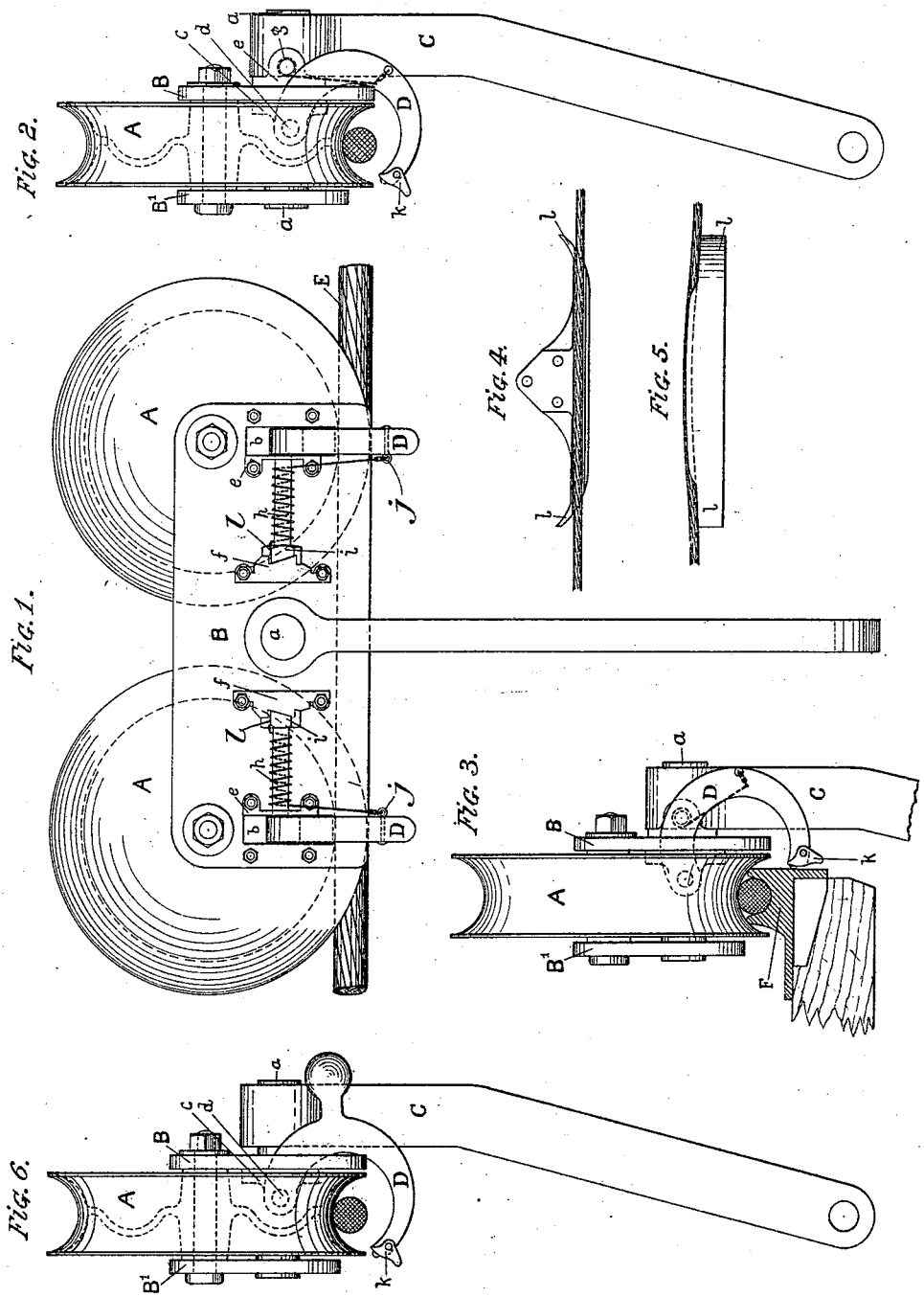
WITNESSES:
INVENTOR
Joseph H. Dickinson
BY
ATTORNEY

United States Patent Office.

JOSEPH H. DICKINSON, OF TRENTON, NEW JERSEY.

AERIAL TRAMWAY.

SPECIFICATION forming part of Letters Patent No. 549,060, dated October 29, 1895.

Application filed September 28, 1893. Serial No. 486,658. (No model.)

*To all whom it may concern:*

Be it known that I, JOSEPH H. DICKINSON, a citizen of the United States, residing at Trenton, in the county of Mercer and State of New Jersey, have invented certain new and useful Improvements in Aerial Tramways, of which the following is a specification.

My invention relates to that species of aerial tramways in which a carriage traveling upon a cable or tram-rope conveys the loads to be carried.

The object of my invention is to provide means, such as a guard, for surely retaining the wheels of a carriage upon the tram-rope, thus preventing the derailment of the carriage by reason of any deflection of the tram-rope or sudden shock to the carriage, and, further, to provide means which will enable such guard to press the supports which sustain the tram-rope intermediately the end supports thereof.

I shall now proceed to describe my invention with reference to the accompanying drawings, forming a part of this specification, in which—

Figure 1 shows a side view of the carriage in position upon the tram-rope and embodying my invention. Fig. 2 shows an end view of the carriage and a side view of one of my guards attached thereto. Fig. 3 is an end view of the carriage, showing the position of the guard when the carriage is passing over a saddle or intermediate support of the tram-rope. Fig. 4 is a plan view of a saddle used to support the tram-rope. Fig. 5 is a side view of such saddle, and Fig. 6 is a view of a modified form of guard operating by force of gravity alone.

In the drawings, A A are the grooved wheels of the carriage.

B B' are iron plates, joined to form the frame of the carriage, and in which are fitted the axles of the wheels and from which is suspended the bucket or carriage-body.

C is the hanger or support to which the bucket or carriage-body (not shown in the drawings) is attached.

D D are the guards, curved, as shown in Figs. 2 and 3, to bring them under the tram-rope upon which the wheels run.

E is the tram-rope, and F is a saddle resting upon a proper support and sustaining the tram-rope.

The carriage-frame, being made of two iron plates B B', is provided with openings for the axles of the wheels and for the pin a, by which the hanger C is attached to the carriage. The plate B is also provided with slots through which are passed the two guards D D and with openings through which are passed the bolts (shown in Fig. 1) for attaching to the plate various parts of the guard device. The location of the slots through which the guard-pieces pass is indicated at b b in Fig. 1, and they are made of a sufficient length to permit the partial rotation of the guards D D. The wheels A A are provided with spokes or a web, curved, as shown by the dotted lines in Fig. 2, in order to admit of the guards D D being pivoted inside of the wheels. A metal plate or shoulder (shown in dotted lines in Fig. 2) projects into the wheel A and is attached by bolts, as shown, to the inner side of the plate B. This metal plate or shoulder is provided with a stud a, (indicated in dotted lines in Fig. 2,) upon which the guard B is pivoted and swings. Upon the outer side of the plate B are attached cast-metal pieces e e and f f. The pieces e e are provided with annular openings g, (see Fig. 2,) in which turn the rods h h. Attached to or made integral with the rods h h are the ratchets i i, which take into the teeth l l, formed on the pieces f f, as shown in Fig. 1. Fastened to the ratchet-pieces i i are spiral springs wound about the rods h h and attached at their outer ends to the guards D D at j j by short chains. The purpose of these springs is to assist in maintaining the guards D D in the position shown in Fig. 2, and their tension may be increased by turning the ratchets i i by means of a wrench, as will be apparent on an examination of Fig. 1. Upon the toe or end of the guard D, I prefer to place the small swivel-piece k (shown in Figs. 2 and 3) to take the wear due to the friction with the saddles F as the guard passes them.

The operation of my device is as follows: Upon the carriage being propelled in either direction upon the tram-rope E, the guards D D, by gravity or by the force of the springs attached thereto, or both, are kept in the position shown in Fig. 2 and prevent derailment of the carriage by any deflection of the tram-rope or sudden pull upon or shock to the carriage produced by any cause. When the carriage is about to pass one of the saddles F, the toe-piece $k$ of the guard D comes in contact with one of the curved ends $l$ of the saddle and is instantly deflected outwardly and upwardly, as shown in Fig. 3. The toe of the guard D passes along the entire length of the saddle in contact therewith, and upon reaching the other end thereof at once returns to the position in which it is shown in Fig. 2.

It will of course be understood that the springs used to maintain the guards D D in their positions under the tram-rope may be dispensed with and a weight properly located upon the guard or connected with it substituted in the place of each spring, and I have shown such a modification of the apparatus in Fig. 6.

Having thus described my invention, what I claim is—

1. In a carriage adapted to run on an aerial tramway, the frame of the carriage, in combination with a guard normally extending beneath the tram-rope and adapted to be deflected outwardly and upwardly on contacting with the supports of the tram-rope and to return automatically to its normal position after each deflection; substantially as shown and described.

2. In an aerial tramway, a tram-rope supported intermediate its ends upon a laterally curved support, in combination with a carriage adapted to traverse said tram-rope, said carriage having pivotally connected with its frame a guard normally extending beneath the tram-rope and adapted to be deflected laterally and upwardly by contacting with said laterally curved support, and means for automatically returning said guard to its normal position after it has passed said support; substantially as shown and described.

3. In a carriage adapted to run upon an aerial tramway, a frame plate provided with a slot in combination with a deflectable guard playing in said slot, and having its lower end depending beneath the tram-rope; substantially as shown and described.

4. In a carriage adapted to run upon an aerial tram-way, the combination of the carriage frame, a deflectable guard extending beneath the tram-rope, and means fixed on the carriage frame for returning the guard to, and maintaining it in its position beneath the tram-rope after each deflection of the guard from such position; substantially as shown and described.

JOSEPH H. DICKINSON.

Witnesses:
SAML. D. OLIPHANT, Jr.,
F. C. LOWTHORP.